US006363887B1

(12) United States Patent
Davis

(10) Patent No.: US 6,363,887 B1
(45) Date of Patent: Apr. 2, 2002

(54) WILDLIFE FEEDER

(76) Inventor: Charles Davis, 177 Hopkinsville St., Cerulean, KY (US) 42215

( * ) Notice: Subject to any disclaimer, the term of this patent is extended or adjusted under 35 U.S.C. 154(b) by 0 days.

(21) Appl. No.: 09/184,153

(22) Filed: Nov. 2, 1998

(51) Int. Cl.[7] .............................................. A01K 39/00
(52) U.S. Cl. ..................... 119/52.1; 119/52.3; 119/57.9
(58) Field of Search .............................. 119/52.1, 51.01, 119/52.2, 52.3, 57.8, 57.9, 57.03

(56) References Cited

U.S. PATENT DOCUMENTS

| 2,475,207 A | * | 7/1949 | Smith | |
| 3,763,826 A | * | 10/1973 | Portelli | 119/52.1 |
| 4,034,715 A | * | 7/1977 | Arner | 119/51.5 |
| 4,434,745 A | * | 3/1984 | Perkins et al. | 119/57.9 |
| 4,840,143 A | * | 6/1989 | Simon | 119/52.1 |
| 5,016,572 A | * | 5/1991 | Weber et al. | 119/52.1 |
| 5,062,388 A | * | 11/1991 | Kilham | 119/52.2 |
| 5,479,878 A | * | 1/1996 | Coulter | 119/51.03 |
| 5,558,040 A | * | 9/1996 | Colwell et al. | 119/52.2 |
| 5,758,596 A | * | 6/1998 | Loiselle | 119/52.2 |
| 5,826,539 A | * | 10/1998 | Bloedorn | 119/52.2 |

* cited by examiner

Primary Examiner—Charles T. Jordan
Assistant Examiner—Yvonne R. Abbott
(74) Attorney, Agent, or Firm—Rick R. Wascher

(57) ABSTRACT

A wildlife feeder having a cap removably attached to a preferably cylindrical body having an exterior surface and an interior feed reservoir. A reflective decal and eye bolts may be secured to the wall of the cylindrical body. The cylindrical body is secured to a base assembly having a plate portion and a slide pedestal to dispense feed from within the feed reservoir through a feeder mouth.

6 Claims, 4 Drawing Sheets

WILDLIFE FEEDER

BACKGROUND OF THE INVENTION

1. Field of the Invention

The present invention relates to animals feeders generally but more particularly to wild game, hereinafter wildlife, feeders placed outdoors for frequent or intermittent use by animals.

2. Description of the Related Art

The art to which the invention relates includes a variety of wildlife feeders of varying design, however, virtually all of these known feeders have include some sort of automatic power driven feed dispensing mechanism mounted to or supported by the feed reservoir. The feed dispensing mechanisms of these other feeders typically include an impeller type blade mounted to a rotating shaft which is driven by a small electric (e.g., battery powered) motor. The impeller blade is positioned near the feed exit port of the reservoir and partially or totally block the port when the motor is in the off or inactive position. When activated the motor shaft of these feeders rotates and turns the impeller blade which allows feed to be dispensed from the exit port of the reservoir and spill on the rotating blade. The rotating blade then slings the feed generally in a circular pattern around the feeder.

In all known feeders of this type the feeder reservoir and the impeller blade assembly must be elevated or raised above the ground to allow the feed to be thrown from the feeder in a wide patter. But more importantly, the weight of a full feed reservoir often requires an elevated operable position because the impeller assembly is universally positioned at the bottom of the reservoir and thus placing such a feeder on the ground could damage the impeller assembly because of the weight of the feed reservoir in addition to causing the feeder to malfunction.

Some of these feeders also include an optional timer mechanism which controls the activation and deactivation of the motor and thus the rotation of the impeller blade. The user simply sets the desired time in which the feed is dispensed and the timer, much like an automatic light timer used in the home triggers the activation of the impeller assembly for a prescribed period of time and then shuts the unit off. The primary disadvantage of this type system is the inability of the game to feed according to their own metabolic patterns (i.e., when they are hungry) as compared to when the user of the feeder decides to dispense the feed. In addition, during wet weather dispensing feed directly onto the ground cause the feed to become wet. If the feed does not dry rapidly the feed will spoil like any other food.

Until now, a feeder which may be placed directly onto the ground or elevated above it and be capable of dispensing feed continuously on demand by the wildlife eating the feed as well as allow only a small amount of the feed within the feed reservoir to be dispensed to minimize spoilage has not been invented.

SUMMARY OF THE INVENTION

The present invention is a wildlife feeder having a base portion and a reservoir portion. The reservoir includes a substantially upright hollow cylinder with spaced apart open ends. One of the ends receives a cap which is easily removed when filling the reservoir and replaced after filling. The cap covers the interior of the reservoir to keep the feed dry when it is stored therein. The end of the cylinder opposite the capped end receives the base portion. The base portion is configured to dispense the feed from within the reservoir as will be described below. The base, cylinder reservoir and cap are preferably molded from a high strength weatherproof plastic or other polymer to insure continuous function during extreme cold and inclement weather.

The base portion preferably includes a ground engaging or bottom plate member with a pedestal projecting upwardly therefrom. At least a portion of the pedestal is sized and shaped to be received within the cylinder for attachment thereto and further includes a feed slide. The slide is a cutout section of the pedestal. Surrounding the pedestal and positioned on top of the plate portion of the base is a ledge or step. The annular circumference of the step allows the feed cylinder to sit on top of the step and be elevated slightly above the level of the plate. The slide then allows for an open communication from the inside of the cylinder (i.e., the feed reservoir) and the outside.

In use the feed within the reservoir is allowed to gravitationally move down the slide and spill onto the plate. This opening can be referred to as the feeder mouth which is small enough to control the amount of feed spilling out of the feeder reservoir, but large enough to prevent clogging of the feeder when common grains such as corn, barley, oats, etc. is used as the preferred feed.

Projecting from the sidewall of the cylinder are optional eye bolts. The eye bolts allow the user to use some tie down such as a length of rope, wire or bailing twine to be secured to the eye bolt and wrapped about a tree in order to secure the feeder in place for use. Securing the feeder to a tree or other structure is not required for use but it is preferred because large game such as deer or even cattle often butt the feeder with their head or antlers when eating the feed. Without a means to secure the feeder to some stable structure the feeder might topple over causing the feed to migrate away from the feeder mouth and thereby prevent the feed from being dispensed.

An optional reinforcing rib or series of reinforcing ribs may be formed on the plate portion of the base to provide enhanced rigidity of the base plate. The enhanced rigidity of the base plate is believed useful if the feed reservoir is full and the feeder is bumper or jostled by the wildlife. The rigid plate tends to maintain the feeder in an upright installed potion.

The inventive feeder has proven particularly useful for feeding deer, turkeys and birds, however, deer are known to have a much greater appetite than turkeys and birds and thus a larger reservoir is preferred. When the user wishes to minimize the feeding of deer or large game and encourage the use of the feeder by turkeys and other game birds an optional chin block may be installed on the plate adjacent to the feeder mouth.

The chin block serves as a stop for the feed and allows the feed to exit the feeder mouth a small amount on the order or an inch or two and further provides a barrier for deer to eat the feed spilled onto the plate and contained by the chin block. The height of the chin block is such that a game bird can use its beak and small head to peck kernels from the area confined by the chin block yet disallow a deer from placing its mouth within this same small area and picking up the feed with its lips. The chin block actually prevents a deer, referred to here for example only because a cow would also be prevented from "lipping" the feed into its mouth, from placing its lips into the small area established by the chin block.

The chin block can be a single element or constructed or several elements. The chin block is a curved or arcuate segment of molded plastic having spaced apart ends. The chin block(s) are preferably secured to the plate portion by a suitable contact cement or other adhesive, but may also be secured with wood screws, or a cooperating taper connection for example which eliminate a third component (e.g., the adhesive or screw) yet enables the chin block to engage the plate for attachment.

In addition, optional light reflective decals may be positioned on the exterior surface of the cylinder to allow the user searching for the feeder at night to locate it more easily with the aid of a flashlight or other spotting light.

All objects, features, and advantages are contemplated and considered to be within the scope of the present invention whose only limitation is the scope of the appended claims, even though such objects, features, and advantages are not specifically set forth herein.

DETAILED DESCRIPTION OF THE PREFERRED EMBODIMENT(S)

Figure 1B:
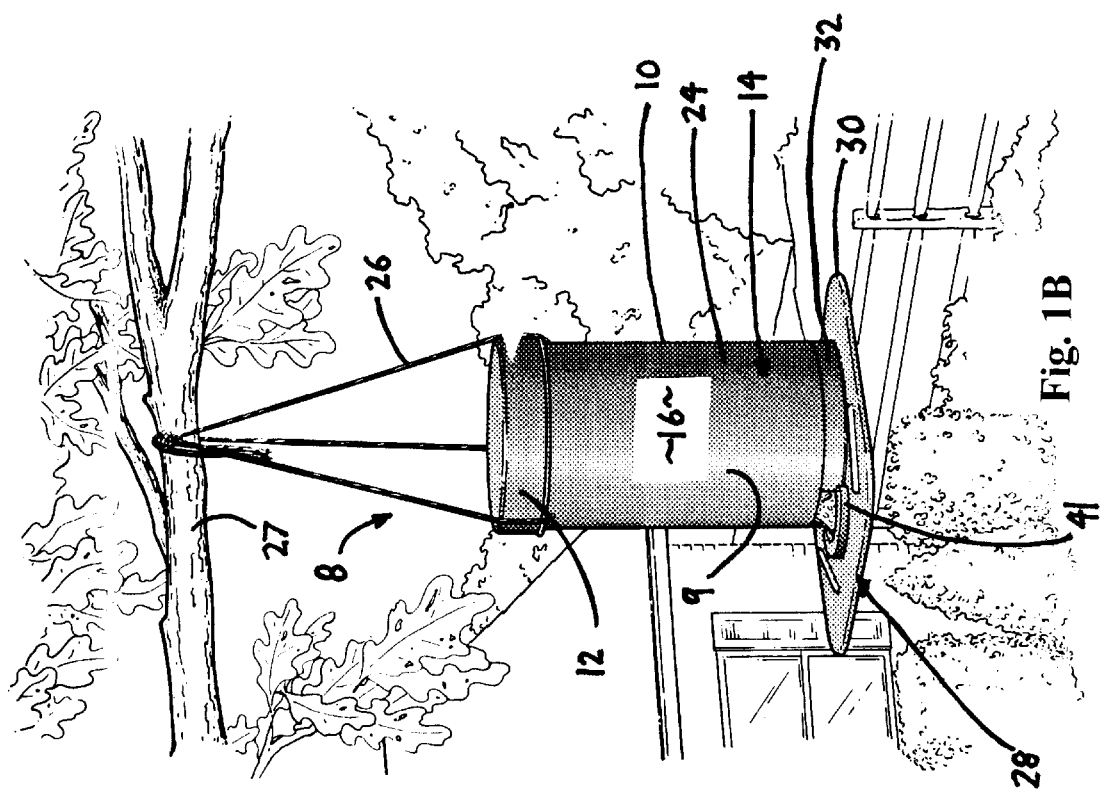
FIG. 1A and 1B are elevated perspective views of embodiments of the present invention.
Figure 1A:
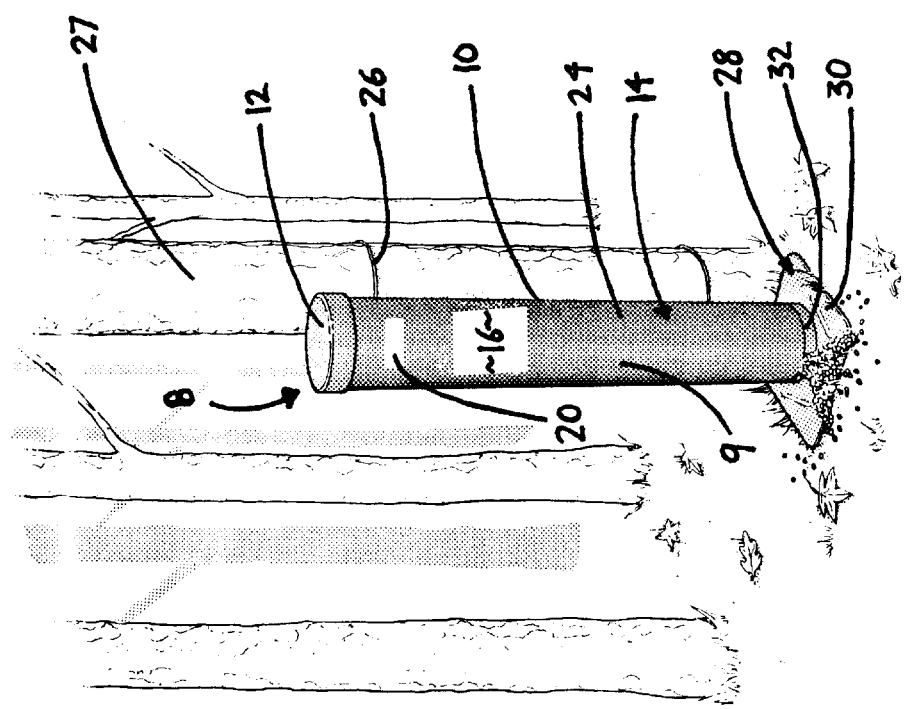
Figure 2:
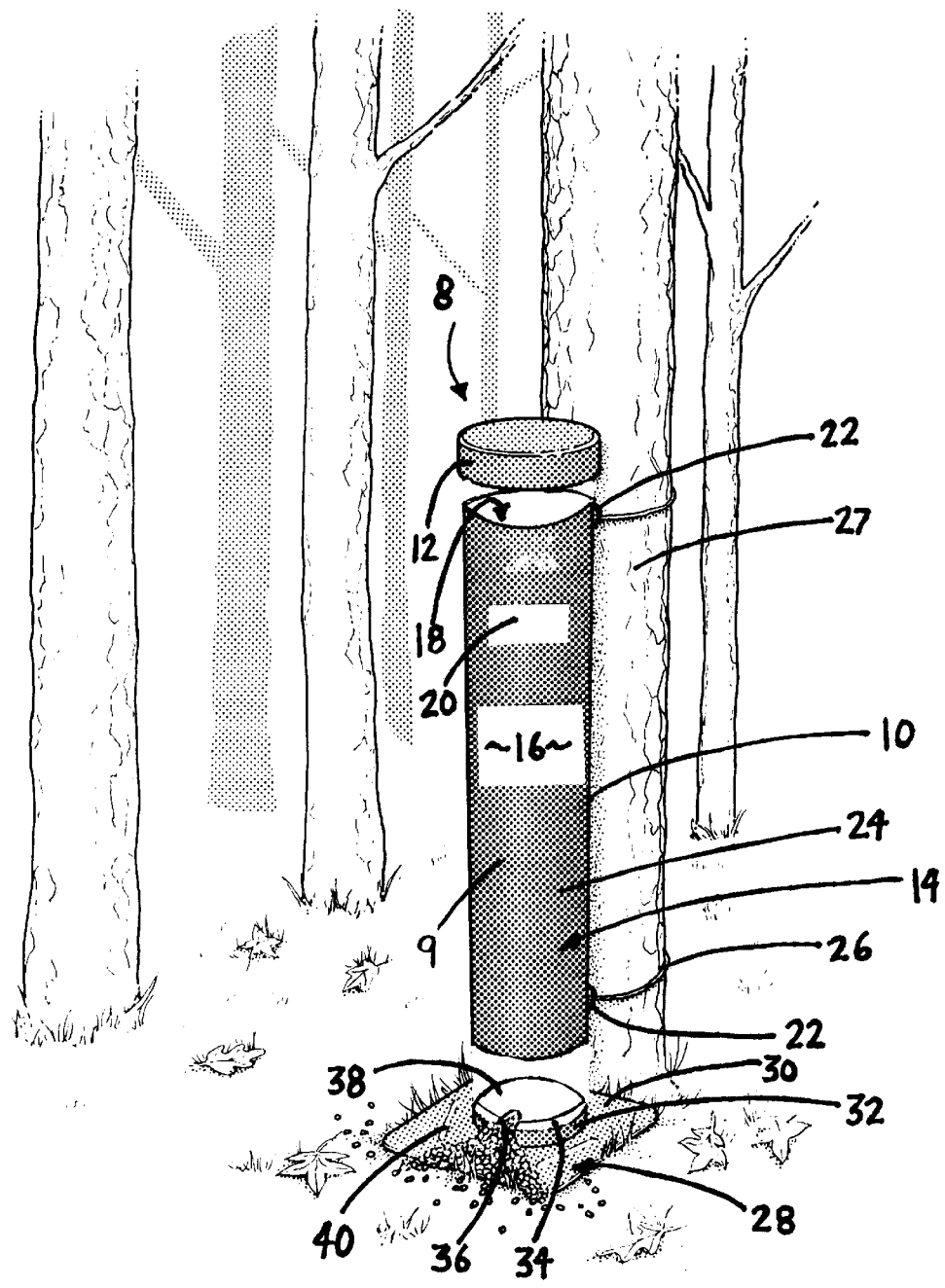
FIG. 2 is an exploded perspective view of the embodiment shown in FIG. 1A.

With reference to FIGS. 1A, 1B and 2 an embodiment of the wildlife feeder of the present invention is designated generally by the reference numeral 8. The feeder 8 has a front 9 and back 10. A cap 12 removably attached to a hollow, preferably cylindrical, body 14 having an exterior surface 16 and an interior feed reservoir 18. Optional reflective decal 20 and eye bolts 22 are secured to the wall 24 of the body 14. Tie down 26 may be looped or knotted to the eye bolts 22 to enable the user to tie the feeder 10 to a stable upright structure such as a tree 27 a ground engaging (FIG. 1A) or elevated position (FIG. 1B).

The body 14 is secured to a base portion designated generally by the reference numeral 28 by a press fit or by any other suitable means of attachment such as through the use of a suitable adhesive, weld, screws (not shown), etc. With reference to FIGS. 1A, 1B, 2, 3A and 3B, the base 28 further includes a plate portion 30 and an upright pedestal 32. The pedestal 32 further comprises a step or ledge 34 on which the body 14 is positioned during assembly, and a feed slide 36 which slopes downwardly from the top 38 of the pedestal 32 toward the plate 30.

Figure 3A:
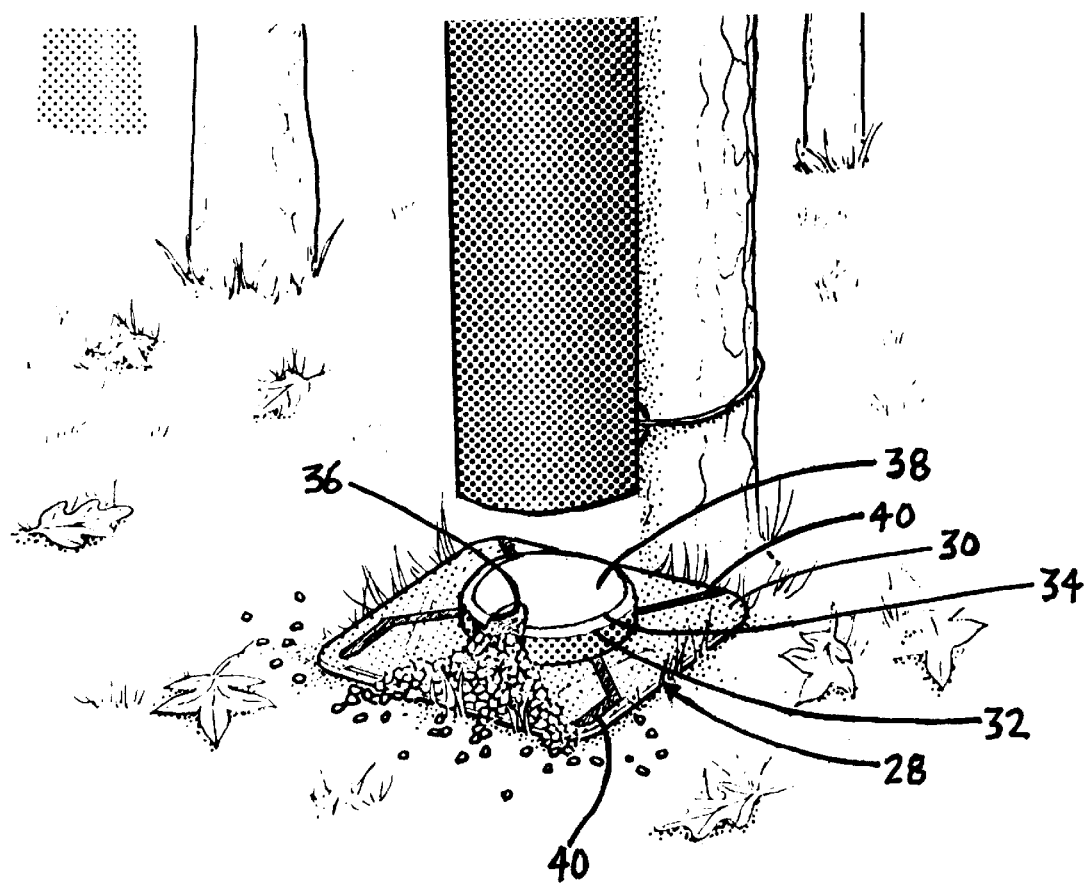
FIGS. 3A and 3B are elevated perspective views of the base portion of the invention shown in FIGS. 1 and 2.
Figure 3B:
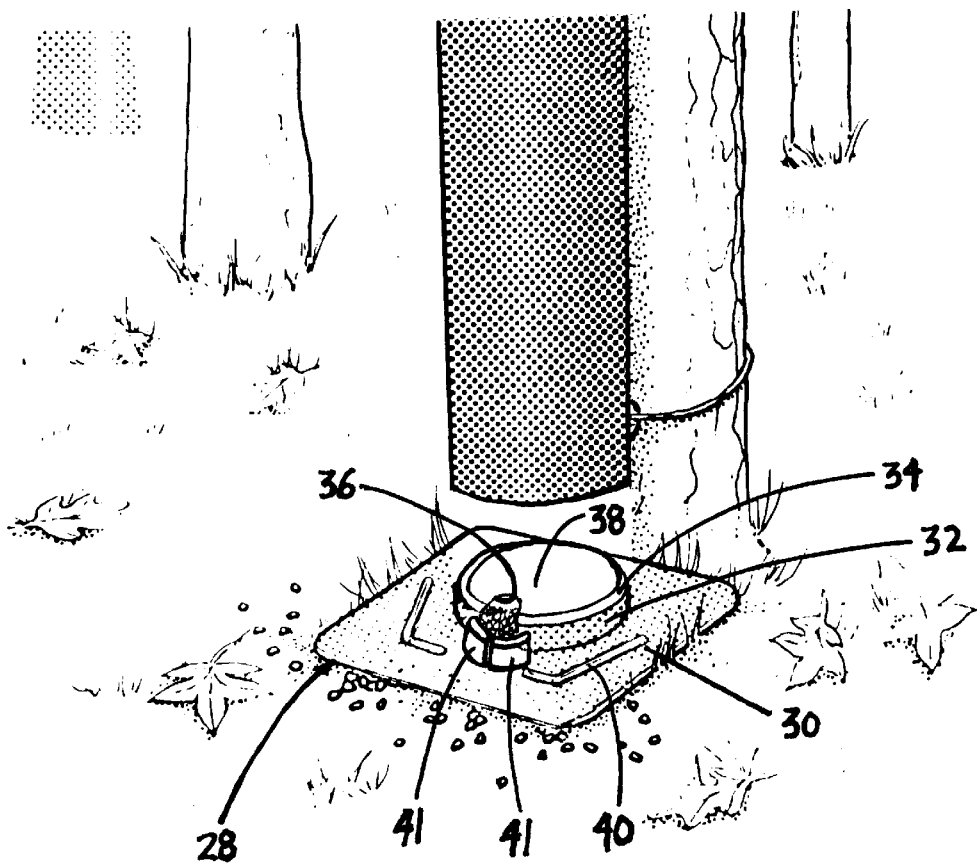

In the preferred embodiment the plate 30 further includes reinforcing ribs 40 and may support optional feed chin blocks 41. In the preferred embodiment the reinforcing ribs 40 are placed around the periphery 41 of the plate 30 (see FIG. 3A). As shown in FIG. 3B the chin block is constructed to two elements having an arcuate shape. As shown in FIG. 1B, the chin block may be a single element arcuate element. (With respect to FIG. 1B the term "chin block" is a bit of a misnomer because this figure shows a bird feeder embodiment and thus element 41 of this figure most likely does not block a chin but serves to corral the feed exiting from the body 14.) With the chin block 42 secured to the plate 30, the feed 44 is corralled within a small area adjacent the feeder mouth 46 (see FIGS. 1B and 3B for comparison).

In use, the cap 12 is removed from the cylinder 14 which enables the user to pour feed such as shelled corn into the reservoir 18 and replace the cap 12 thereafter. The feed within the reservoir is allowed to pile up within the reservoir 18 and allow a small amount to travel down the slide 36 of the base 28 and spill onto the plate 30. It may also be contained by the chin block(s) 42 in the manner described above. When wildlife eats the feed thus clearing the feeder mouth opening 46 to the feed reservoir 18 replacement feed moves down the slide 36 and spills onto the plate 30 until the feed reservoir 18 is empty.

These and other embodiments of the present invention shall become apparent after consideration scope of the specification and drawings set forth herein All such embodiments and equivalents thereof are contemplated as part of the present invention whose only limitation is the scope of the appended claims attached hereto.

What is claimed is:

1. A wildlife feeder for dispensing dry feed such as shelled corn and having a front and a back, comprising:

a cylindrical body having spaced apart open ends, a hollow interior and a continuous sidewall having an exterior surface;

a cap removably attached to the cylindrical body to cover one of the open ends;

a base permanently secured to the open end of the cylindrical body opposite the cap to establish a substantially unitary construction of body and base wherein the base further comprises a plate portion having reinforcing ribs, and a pedestal portion extending upwardly therefrom; and the pedestal portion further includes a ledge on which the cylindrical body is positioned enabling a portion of the pedestal to extend upwardly into the cylindrical body for rigid affixation therewith, and a slide extending upwardly from the front of the feeder at the plate and toward the back of the feeder into the hollow interior to establish open communication from the inside of the cylindrical body to the outside onto the plate.

2. The feeder of claim 1, such that at least one reinforcing rib further comprises:

a plurality of reinforcing ribs positioned about the periphery of the plate.

3. The feeder of claim 1, such that:

the slide and the sidewall cooperate to form a feeder mouth to enable feed placed within the cylindrical body to gravitationally move from the hollow interior of the body to the plate.

4. The feeder of claim 3, further including:

a reflective decal affixed to the exterior surface of the sidewall.

5. The feeder of claim 1, wherein:

at least one eye bolt is secured to the exterior surface of the sidewall.

6. The feeder of claim 1, wherein the plate further includes at least one chin block.

* * * * *